United States Patent [19]
Chin et al.

[11] Patent Number: 5,862,845
[45] Date of Patent: Jan. 26, 1999

[54] USE OF ULTRAFAST INTENSE LASER FOR PROCESSING LIGNOCELLULOSIC MATERIAL

[75] Inventors: See Leang Chin, Ste. Foy; Nader Naderi, Cité Universitaire; Simon Lagace, St. Nicolas, all of Canada

[73] Assignee: Universite Laval, Cite Universitaire, Canada

[21] Appl. No.: 100,766

[22] Filed: May 19, 1998

[51] Int. Cl.⁶ .............................. B27M 1/00; B23K 15/00
[52] U.S. Cl. .......................... 144/329; 144/356; 144/364; 144/134.1; 144/380; 358/299; 372/20; 219/121.18
[58] Field of Search ............................... 358/299; 372/18, 372/20, 10, 11, 25; 144/136.1, 134.1, 2.1, 329, 364, 380, 356; 219/121.1, 121.17, 121.18, 121.19

[56] References Cited

U.S. PATENT DOCUMENTS 5,538,056  7/1996  Thoma ...................................... 144/380

OTHER PUBLICATIONS

River, Bryan H. and Minutti, Victor P., Wood and Wood Products, vol. 80, No. 2, 1975 pp. 35, 36 and 38.
Jockerst, Ronald W. and Stewart, Harold A., Wood and Fiber, vol. 8 No. 2, 1976, pp. 107–113.
McMillin, C. W. et al., Forest Products Journal, 1984, vol. 34, No. 1, pp. 13–20.
McMillin, C. W. and Huber, H. A., Forest Products Journal, 1985, vol. 35, No. 1, pp. 23–25.
Hernandez, Roger E., Forest Products Journal, vol. 44, No. 7/8, 1994, pp. 63–66.

*Primary Examiner*—W. Donald Bray
*Attorney, Agent, or Firm*—Swabey Ogilvy Renault

[57] ABSTRACT

A method of processing lignocellulosic material comprises the steps of (a) generating a pulsed laser beam consisting of a train of laser pulses, each laser pulse having a duration less than $1\times10^{-9}$ sec. and a peak intensity of at least $1\times10^{11}$ w/cm$^2$; and (b) directing the laser beam generated in step (a) onto a surface of the lignocellulosic material to cause ionization and fragmentation of macro-molecules thereof. The method of the invention enables one to cut, carve and/or sand the surface of lignocellulosic material without, burning same or damaging the cells of the lignocellulosic material.

10 Claims, 2 Drawing Sheets

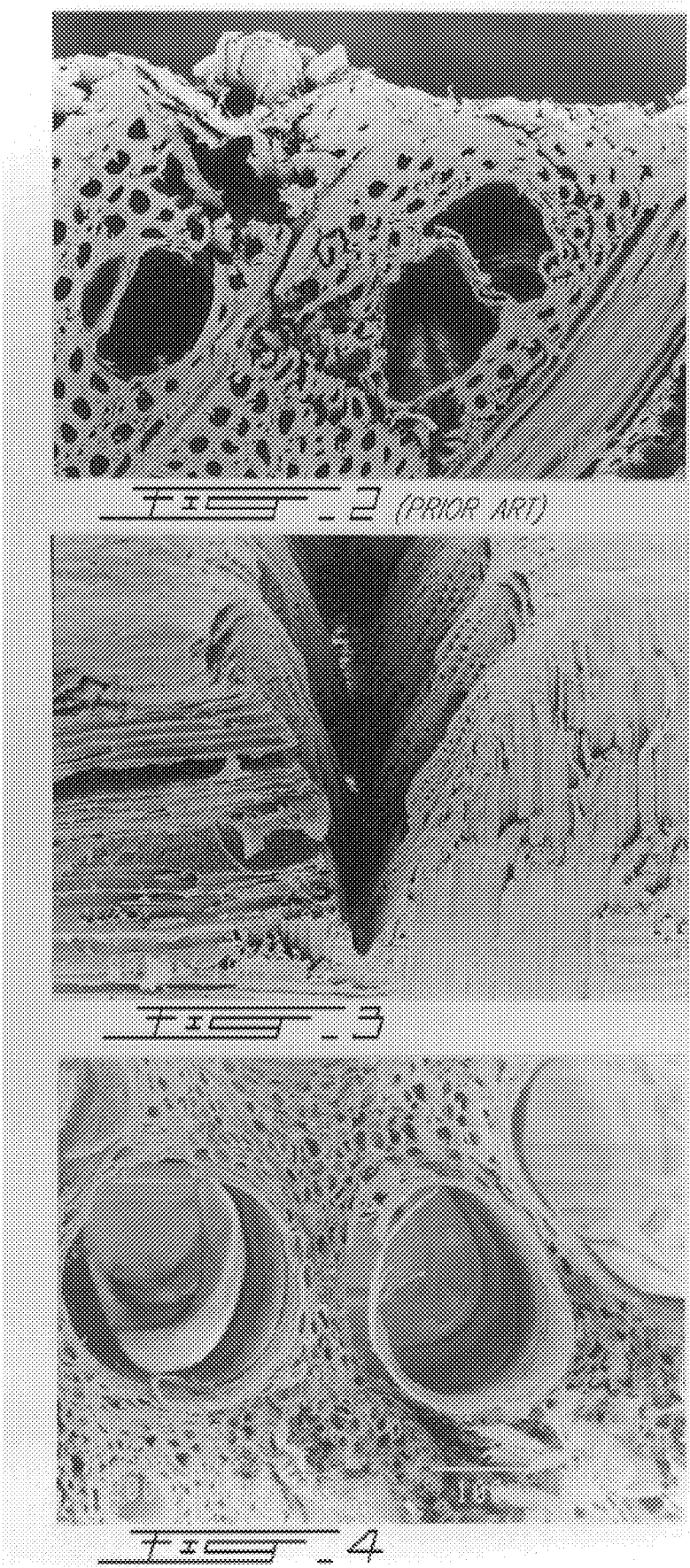

USE OF ULTRAFAST INTENSE LASER FOR PROCESSING LIGNOCELLULOSIC MATERIAL

The present invention pertains to a method of processing lignocellulosic material. More particularly, the invention is concerned with the use of an ultrafast intense laser for processing lignocellulosic material such as wood.

BACKGROUND OF THE INVENTION

Wood has served man for untold centuries. This unique material has been used to provide such basic necessities as shelter, warmth, weapons and tools. One of the important characteristics of wood is the ease with which it can be worked with tools. In the early 19th century, circular saw, band saw and surface planing machines were invented for wood processing. Since then, wood processing has been subjected to improvements depending on the market demand which is mostly affected by the quality and production costs.

Wood processing principally involves the separation of chips from a workpiece up to a desired dimension and surface quality. The process produces characteristic wood failures. During wood processing, the superficial layer is subjected to various types of stress, such as cutting force and friction. If these stresses exceed the elastic deformation range, permanent deformation will take place. It is considered that this permanent deformation plays an important role on the final surface quality and/or subsequent operation. In the past, many researches have chosen the shear strength at the glue line of a laminated board as a surface quality criterion. Through these studies, the board was planed under various machine conditions. It was then laminated and subjected to shear test. Despite an apparently smooth surface after conventional surface planing, previous studies show that in most cases the gluing performance was altered. This alteration has been attributed to the superficial damages due to the stresses which has been developed through machining processing. River and Miniutti in Wood and Wood Products, Vol. 80, No. 2, 1975, pp. 35–36 and 38, evaluated the lamination performance in yellow polar, and red oak specimens planed with saw, knife planer and jointer. The overall gluing performance decreased progressively from planed surface with jointer to planer and then to sawn surface.

Jokerst and Stewart, in Wood and Fiber, Vol. 8, No. 2, 1976, pp. 107–113, reported lower shear strength at the glue line of laminated boards on the surface planed with an abrasive planer as compared to a knife planer. The reduction of the shear strength at the glue line has been attributed to the normal force component which developed through cutting action. The magnitude of this normal force is related to the knife geometry, as well as the combination of the material, and machine conditions. If this vertical force exceeded the stress at the proportional limit of the wooden workpiece, the superficial cells will be subjected to a permanent crushing and breakage. As a result, any glue application for laminating or finishing products when applied on these damaged cells will result in lower strength and quality. The severity of damage depends on the specific cutting conditions. The development of this perpendicular component mostly has been attributed to large rake angle in abrasive planing, negative clearance angle in knife planer, as well as the development of the wear at cutting edge.

A fixed-knife pressure-bar system has been proposed as an alternative planing method to reduce or eliminate subsurface damage induced in wood. The fixed-knife pressure-bar surface planing improved the shear strength at the lamination line compared to a knife-planer method after a cycle of sorption. Hernandez, in Forest Product Journal, Vol. 44, No. 7/8, 1994 pp. 63–66, confirms the superior gluing performance of the maple board planed with fixed-knife pressure-bar compared to knife planing method. The difference mostly related to a negative clearance angle through the knife-planer action compared to positive clearance angle and lower normal force components through the fixed-knife pressure-bar planing method. However, this should take into account the dealing with a knife during surface preparation, which means continuous changing of the sharpness and knife geometry due to the knife wear.

In recent years, laser light was introduced to the wood industry with a view to improving the above mentioned mechanical difficulty. A laser beam acts as a fresh knife with the ability to apply the desired cutting condition with minimum kerf width. The application of laser light to wood processing was promising since each laser beam acts as an individual sharp, disposal cutting edge with high precision and performance. However, laser planed surfaces always left behind a layer of char because of the specific strong heating action of laser light. Such heating action blows away surface material while also heating the surface. The heated surface in turn oxidizes since it reacts mostly with oxygen molecules in the air, leaving behind a burnt mark. McMillin and Huber, in Forest Products Journal, Vol. 35, No. 1, 1985, pp. 23–25, evaluated the glue bond strength of a laser planed surface. The results show that the strength of laser cut oak glued with polyvinyl acetate adhesive was reduced to 75% of sawn lamination. It was concluded that a light sanding or planing was necessary to remove the burned superficial layer. The blackened-up burned superficial layer contained a powdery char. This of course was not appreciated in the wood industry.

SUMMARY OF THE INVENTION

It is therefore an object of the invention to overcome the above drawbacks and to provide a method of processing lignocellulosic material without burning same or substantially damaging the cells of the lignocellulosic material.

In accordance with the present invention, there is thus provided a method of processing lignocellulosic material, which comprises the steps of:

a) generating a pulsed laser beam consisting of a train of laser pulses, each laser pulse having a duration less than $1 \times 10^{-9}$ sec. and a peak intensity of at least $1 \times 10^{11}$ w/cm$^2$; and b) directing the laser beam generated in step (a) onto a surface of the lignocellulosic material to cause ionization and fragmentation of macro-molecules thereof.

Applicants have found quite unexpectedly that by using a pulsed laser beam with pulses each having a duration less than $1 \times 10^{-9}$ sec. and a peak intensity of at least $1 \times 10^{11}$ w/cm$^2$ to process lignocellulosic material, the macro-molecules of the lignocellulosic material become ionized and undergo fragmentation so that there is no heating and subsequent oxidation of the surface thereof or any substantial damage of the cells of the material. If the pulse duration is equal to or greater than $1 \times 10^{-9}$ sec., there is heating and oxidation of the lignocellulosic material. If, on the other hand, the peak intensity of each laser pulse is below $1 \times 10^{11}$ w/cm$^2$, there is no significant ionization of the macro-molecules.

When a pulsed laser beam having the above pulse duration and peak intensity interacts with a lignocellulosic material such as wood, the macro-molecules of the wood cells become ionized and highly charged, which causes the molecules to become unstable and to then undergo fragmentation. A molecule exposed to the ultrafast intense laser beam is first ionized through multiphoton absorption during the rising portion of the laser pulse. The outgoing electron, still inside the strong laser field, would have a probability of being accelerated back towards the parent ion. This so-called re-scattering depends on the phase of the laser's electric field at the time of ionization. The kinetic energy of the re-scattered electron is typically of the order of one eV since the typical laser intensity under which multiphoton ionization takes place is of the order of $10^{13}$ W/cm$^2$ and the kinetic energy of the electron is equal to the ponderomotive potential given by $e^2E^2/4m\omega^2$, where e and m are the electronic charge and mass, E, the laser's field amplitude, and $\omega$, the laser frequency. The absorption cross-section of such low energy electron is very large. This results in a recombination with the parent ion followed normally by a strong coupling to some doubly excited configuration of the molecule. It is believed that the doubly excited molecule would immediately dissociate (dissociative recombination), while the strong laser field is still on. This represent stretching of the molecule. There is a critical distance during the stretching at which the laser field has a very high probability of ionizing the molecule, ejecting more than one electrons and resulting in a doubly or multiply charged parent ion (enhanced ionization). This would in turn result in a mutual repulsion of the various positively charged groups, or Coulomb explosion. The consequence is fragmentation of the parent molecules.

The explosion ejects shattered fragments (powder) most of which are 1–3 microns in size. This is probably because such explosion is isotropic. The fact that the shattered particles are charged half positively and half negatively could be due to a process of random bond breaking during Coulomb explosion leaving behind charged particles with equal probability of being charged negatively and positively.

The fact that a very clean and practically undamaged wood surface is left behind after irradiation by the ultrafast intense laser pulses represents a totally new and unexpected phenomenon. During such fast interations involving principally electronic transitions in the femtosecond time scale, vibrational excitation is not directly involved and hence local heating is not possible. Also, the fact that the cells on the laser irradiated surface are practically intact is an indication that most of the molecules interacting with the laser beam have been exploded and ejected out of the surface. There is however some granular structure (granular size of about 1 to 2 microns) on the laser irradiated surface if one looks at it under an electron microscope using 10,000 magnification. There is a sign of micro-deformation on the surface probably due to the small energy transferred to the remaining surface cells through a recoil of the ejected powder whose size is of the same order of magnitude as that of the granularity. Some of the recoiled powder could also have stuck on the surface. However, the small recoil energy is not enough to vibrationally excite the surface molecules so that again surface heating is negligible. Thus, there is no oxidation of the surface and the surface is not blackened and practically not damaged.

According to a preferred embodiment, each laser pulse has a duration of $1.0\times10^{-15}$ to less than $1.0\times10^{-9}$ sec. Generally, the peak intensity ranges from $1.0\times10^{11}$ to $1.0\times10^{18}$ w/cm$^2$, preferably from $1.0\times10^{12}$ to $1.0\times10^{15}$ w/cm$^2$.

According to another preferred embodiment, step (a) is carried out by using a Ti: sapphire laser system comprising a 100 MHz self mode-locked Ti: sapphire oscillator coupled to a 1 KHz regenerative amplifier. Preferably, the laser pulses have a repetition rate of 1 KHz and each have a wavelength centered at 800 nm for efficient processing of the lignocellulosic material.

According to a further preferred embodiment, step (b) is carried out by focussing the laser beam generated in step (a) onto the surface of lignocellulosic material to provide a focussed beam having a focal diameter of 1 to 200 $\mu$m, typically about 50 $\mu$m.

The method according to the invention enables one to cut, carve or plane a surface of lignocellulosic material, depending on the scanning speed of the laser beam, the average power thereof and the physical properties of the lignocellulosic material.

BRIEF DESCRIPTION OF THE DRAWINGS

Further features and advantages of the invention will become more readily apparent from the following description of preferred embodiments, reference being made to the accompanying drawings, in which:

FIG. 2 is a photograph taken through a scanning electron microscope illustrating the superficial damage of a maple board following conventional planing with a knife planer;

FIG. 3 is another photograph taken through a scanning electron microscope illustrating the clean cut obtained in a maple sample after irradiation by a pulsed laser beam according to the invention; and FIG. 4 is a further photograph taken through a scanning electron microscope illustrating the quality of the paned surface of an oak sample following planing with a pulsed laser beam according to the invention.

DESCRIPTION OF PREFERRED EMBODIMENTS

Figure 1:
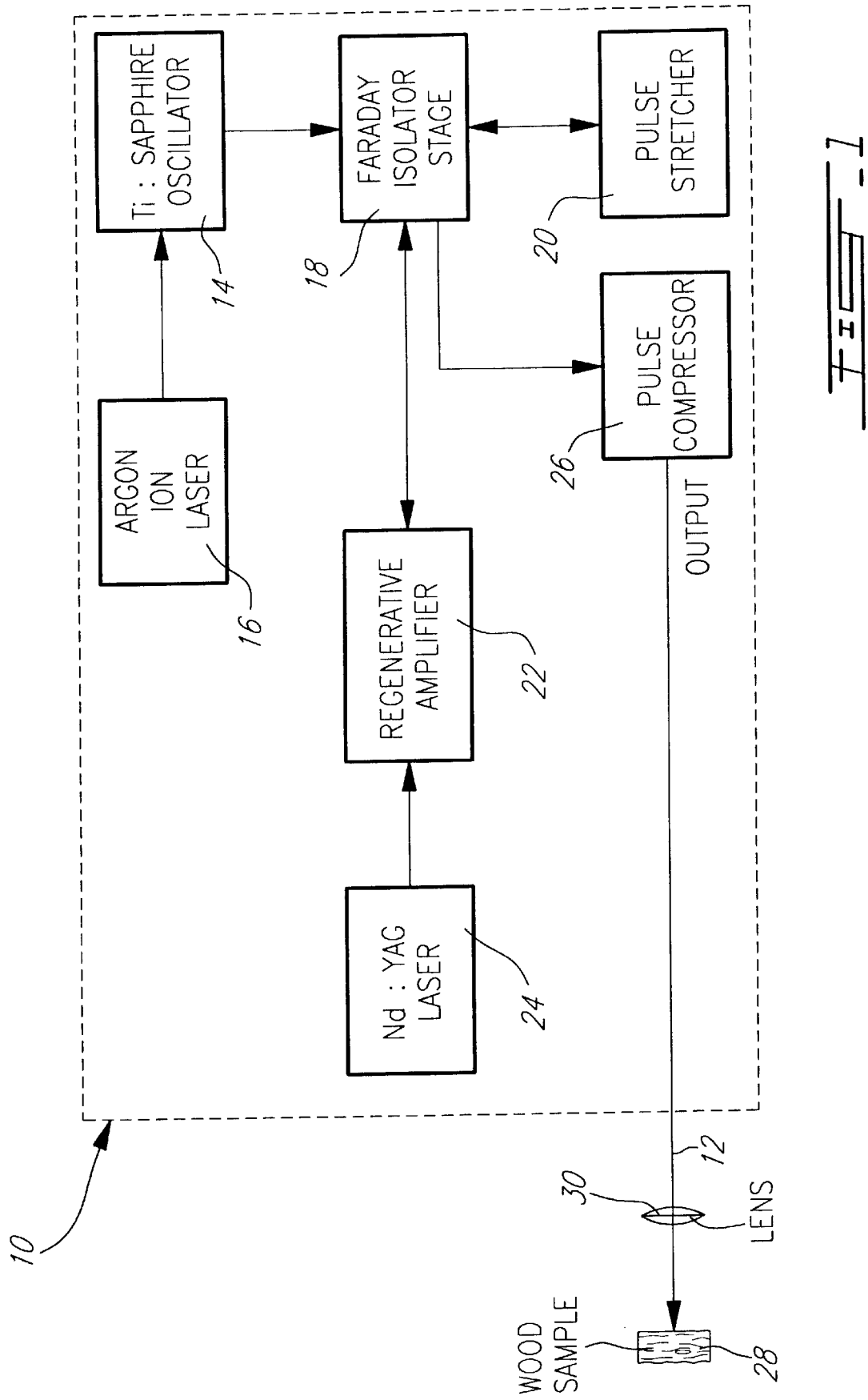
FIG. 1 is a block diagram schematically illustrating a method of processing a wood sample, according to a preferred embodiment of the invention.

Referring first to FIG. 1, there is illustrated a commercial Ti: sapphire laser system which is generally designed by reference numeral 10 and is operative to generate an ultrafast intense laser beam 12. The laser system 10 comprises a 100 MHz self mode-locked Ti: sapphire oscillator 14 which is pumped by a laser beam from an argon ion laser 16 and which is coupled via a Faraday isolator stage 18 and a pulse stretcher 20 to a 1 KHz regenerative amplifier 22 pumped by a laser beam from a Nd:YAG laser 24, and then to a pulse compressor 26.

The laser beam from the argon ion laser 16 is used to pump the Ti: sapphire oscillator 14, the laser output of which is directed through the Faraday isolator stage 18 and pulse stretcher 20, and then into the regenerative amplifier 22 which is pumped by the laser beam from the Nd:YAG laser 24. The amplified laser beam returns to the Faraday isolator stage 18 and is then injected into the pulse compressor 26. The output from the pulse compressor 26 provides a train of laser pulses 12 whose duration can be varied by properly adjusting the pulse compressor 26. The peak intensity of each laser pulse can be varied by property adjusting the regenerative amplifier 22 and pulse compressor 26, and also by focussing the pulsed laser beam 12 onto the surface of the wood sample 28 with a positive lens 30. Generally, the pulse duration ranges from $1.0\times10^{-13}$ to $0.2\times10^{-9}$ sec, and is preferably about $1.5\times10^{-13}$ sec. The peak intensity, on the other hand, preferably ranges from $1.0\times10^{12}$ to $1.0\times10^{15}$ w/cm$^2$. The laser pulses have a repetition rate of 1 KHz and the wavelength is centered around 800 nm.

When the pulsed laser beam 12 was focussed onto the wood sample 28 with the lens 30, a stream of wood powder shot out from the surface leaving behind a clean cut without any black mark. The particles in the powder were charged roughly half positively and half negatively. This was observed by putting two oppositely charged electrodes across the ejected powder jet and it was found that the two electrodes were covered by an almost equal amount of powder.

The laser irradiated surface was examined under a scanning electron microscope. In contrast to the surface planed with a knife planer as shown in FIG. 2, the ultrafast intense laser processed surfaces shown in FIGS. 3 and 4 exhibit a superior quality. As it is apparent, the wood cells are practically intact. Thus, laser cut wood obtained by the method according to the invention exhibits improved glue-bond strength and quality.

We claim:

1. A method of processing lignocellulosic material, which comprises the steps of:
   a) generating a pulsed laser beam consisting of a train of laser pulses, each laser pulse having a duration less than $1 \times 10^{-9}$ sec. and a peak intensity of at least $1 \times 10^{11}$ w/cm$^2$; and
   b) directing the laser beam generated in step (a) onto a surface of said lignocellulosic material to cause ionization and fragmentation of macro-molecules thereof.

2. A method as claimed in claim 1, wherein each laser pulse has a duration of $1.0 \times 10^{-15}$ to less than $1.0 \times 10^{-9}$ sec.

3. A method as claimed in claim 2, wherein the pulse duration is $1.5 \times 10^{-13}$ sec.

4. A method as claimed in claim 1, wherein the peak intensity ranges from $1.0 \times 10^{11}$ to $1.0 \times 10^{18}$ w/cm$^2$.

5. A method as claimed in claim 4, wherein the peak intensity ranges from $1.0 \times 10^{12}$ to $1.0 \times 10^{15}$ w/cm$^2$.

6. A method as claimed in claim 1, wherein each laser pulse has a wavelength centered at 800 nm.

7. A method as claimed in claim 6, wherein said laser pulses have a repetition rate of 1 KHz.

8. A method as claimed in claim 1, wherein step (a) is carried out by using a Ti: sapphire laser system comprising a 100 MHz self mode-locked Ti: sapphire oscillator coupled to a 1 KHz regenerative amplifier.

9. A method as claimed in claim 1, wherein in step (b) said laser beam is focussed onto said surface to provide a focussed beam having a focal diameter of 1 to 200 μm.

10. A method as claimed in claim 9, wherein said 1 diameter is about 50 μm.

* * * * *